(12) United States Patent
Arakawa

(10) Patent No.: US 7,164,822 B2
(45) Date of Patent: Jan. 16, 2007

(54) VARIABLE OPTICAL GAIN CONTROL DEVICE

(75) Inventor: Tomiyuki Arakawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 54 days.

(21) Appl. No.: 10/323,935

(22) Filed: Dec. 20, 2002

(65) Prior Publication Data

US 2004/0013339 A1 Jan. 22, 2004

(30) Foreign Application Priority Data

Jul. 18, 2002 (JP) ............... 2002-209235

(51) Int. Cl.
*G02B 6/26* (2006.01)
*G02B 6/42* (2006.01)

(52) U.S. Cl. .......................... 385/42; 385/41

(58) Field of Classification Search ................. 385/14, 385/15, 41, 42, 129–132, 141
See application file for complete search history.

(56) References Cited

U.S. PATENT DOCUMENTS

| | | | |
|---|---|---|---|
| 4,737,002 A * | 4/1988 | Boucouvalas | 385/42 |
| 5,039,190 A * | 8/1991 | Blonder et al. | 359/342 |
| 5,136,670 A * | 8/1992 | Shigematsu et al. | 385/42 |
| 5,170,458 A * | 12/1992 | Aoyagi et al. | 385/127 |
| 5,187,610 A * | 2/1993 | Habbab et al. | 359/337 |
| 5,515,195 A * | 5/1996 | McAdams | 385/42 |
| 5,574,739 A * | 11/1996 | Carruthers et al. | 372/27 |
| 5,583,957 A * | 12/1996 | Blow | 385/21 |
| 5,703,975 A * | 12/1997 | Miller et al. | 385/16 |
| 5,949,945 A * | 9/1999 | Okano et al. | 385/132 |
| 5,982,973 A | 11/1999 | Yan et al. | 385/141 |
| 6,002,823 A * | 12/1999 | Chandross et al. | 385/50 |
| 6,049,415 A * | 4/2000 | Grubb et al. | 359/341.1 |
| 6,411,757 B1 | 6/2002 | Brener et al. | 385/43 |

(Continued)

FOREIGN PATENT DOCUMENTS

JP 03-071115 3/1991

(Continued)

OTHER PUBLICATIONS

Hikaritsuushin Technical Handbook 2002 p. 323-326.

*Primary Examiner*—Jared J. Fureman
*Assistant Examiner*—Kumiko C. Koyama
(74) *Attorney, Agent, or Firm*—Rabin & Berdo, P.C.

(57) ABSTRACT

A variable optical gain control device is capable of amplifying an optical signal while controlling its luminous intensity. The device is made up of optical waveguide paths which are formed on a flat face of a substrate and includes an input directional coupler for combining an input optical signal and a pump laser light; a luminous intensity control portion in the form of a Mach-Zehnder interferometer for controlling the luminous intensity of the optical signal combined with the pump laser light; and an output directional coupler for separating the pump laser light from the resulting optical signal. The luminous intensity control portion is doped with a rare earth element so that the optical signal is amplified by means of the pump laser light, while a heater is applied to one of the optical waveguide paths forming the Mach-Zehnder interferometer to control the luminous intensity of the optical signal.

16 Claims, 3 Drawing Sheets

U.S. PATENT DOCUMENTS 6,778,319 B1 * 8/2004 Chavez-Pirson et al. .... 359/333

FOREIGN PATENT DOCUMENTS

| JP | 04-213884 | 8/1992 |
| JP | 05-082895 | 4/1993 |
| JP | 5-190945 | 7/1993 |
| JP | 08-211426 | 8/1996 |
| JP | 08-242030 | 9/1996 |
| JP | 2000-180803 | 6/2000 |
| JP | 2000-244041 | 9/2000 |
| JP | 2000-314814 | 11/2000 |
| JP | 2001-201725 | 7/2001 |

* cited by examiner

VARIABLE OPTICAL GAIN CONTROL DEVICE

BACKGROUND OF THE INVENTION

1. Field of the Invention

The present invention relates to an optical circuit of a variable optical gain control device, which is used for controlling the luminance intensity in an optical communication system, and also to the structure of the optical circuit.

2. Description of the Related Art

Nowadays, a lot of the optical communication systems in the world introduce a Wavelength Division Multiplexing (WDM) system as the most effective systems for increasing the optical transmission capacity. Heretofore, in the WDM system, as a means for arbitrarily controlling the luminance intensity to an arbitrary value, there has been used a Variable Optical Attenuator (VOA) having the function of changing the amount of attenuation of the luminance intensity. In view of the increased tendency of such an optical communication system to be provided with the WDM system, there is being still vigorously carried out the technological development on such a VOA that is able to change the attenuation of the luminance intensity in response to an electrical signal.

In the WDM system, the VOA is used for two principal purposes. One is to equalize the level of the optical signal which is different on every wavelength thereof, and the other is to keep the output level of the optical signal constant even if the wavelength and the input level of the optical signal to be amplified are changed when the optical amplification factor is made constant in a multi-wavelength collective optical amplifier. The reason for keeping the optical amplification factor constant is for preventing the deterioration of the system characteristic caused by variation in the wavelength characteristic of the optical amplifier As one prior art VOA, there is a VOA of the non-mechanical type which makes use of the thermo-optic effect. Typically, the VOA of this type is provided with a Mach-Zehnder interferometer formed on a glass-made optical waveguide path. Each of two optical paths of this interferometer is provided with a heater, and the phase difference of the optical signal in each waveguide path between these optical paths is changed by the temperature difference between two heaters. The VOA of this type can be arranged in the form of an array with ease, and the VOA having 20 to 40 channels is now being produced and already on the market.

In case of executing the optical gain control by means of the prior art VOA, however, as the luminance intensity is controlled by attenuating it, there occurs such an inconvenience that the luminance intensity can not help being smaller than the original one.

On the one hand, if it is tried to control the optical gain by mean of an Erbium Doped Fiber Amplifier (EDFA), problems to be considered would come up. For instance, large noise generation, or an increase in the dimension of the entire system may increase because the optical fiber has to be wound many times before putting it in a predetermined package case, and so forth. Furthermore, in case of controlling the optical gain by mean of a semiconductor optical amplifier, the coupling loss between the amplifier and the optical fiber becomes so large that dependency on a biased wave is made stronger.

SUMMARY OF THE INVENTION

Accordingly, the invention has been made in view of the problems as described above, and an object of the invention is to provide a novel and improved variable optical gain control device which causes not only less noise but also less coupling loss, and makes it possible to amplify the luminance intensity.

In order to solve the problems as described above, according to the invention, there is provided a variable optical gain control device having an optical circuit constituted by means of optical waveguide paths formed on a flat face of the substrate, the optical circuit including a first port for receiving an optical signal inputted thereto; a second port for receiving an excitation light inputted thereto; a first directional coupler portion for merging the optical signal and the excitation light; a luminance intensity control portion, for instance made up of a circuit of the Mach-Zehnder type, for controlling the luminance intensity of the optical signal combined with the excitation light: the second directional coupler portion for separating the excitation light from the optical signal of which the luminance intensity has been controlled by the luminance intensity control portion; a third port for outputting the luminance controlled optical signal; and a fourth port for outputting the excitation light as separated. The optical waveguide path is doped with a rare earth element, and the optical signal is amplified by the function of the excitation light and is then outputted.

BRIEF DESCRIPTION OF THE DRAWINGS

The invention will now be described in detail by way of examples of a variable optical gain control device embodying the invention with reference to the accompanying drawings. In the following description and drawings, elements having a substantially identical function and constitution of the invention are designated by an identical reference numeral and character in order to avoid iterative and redundant descriptions. In the drawings:

FIG. 1B is a sectional view taken on line A—A of FIG. 1A.

DETAILED DESCRIPTION OF THE PREFERRED EMBODIMENTS

First Embodiment

Figures 1A, 1B:
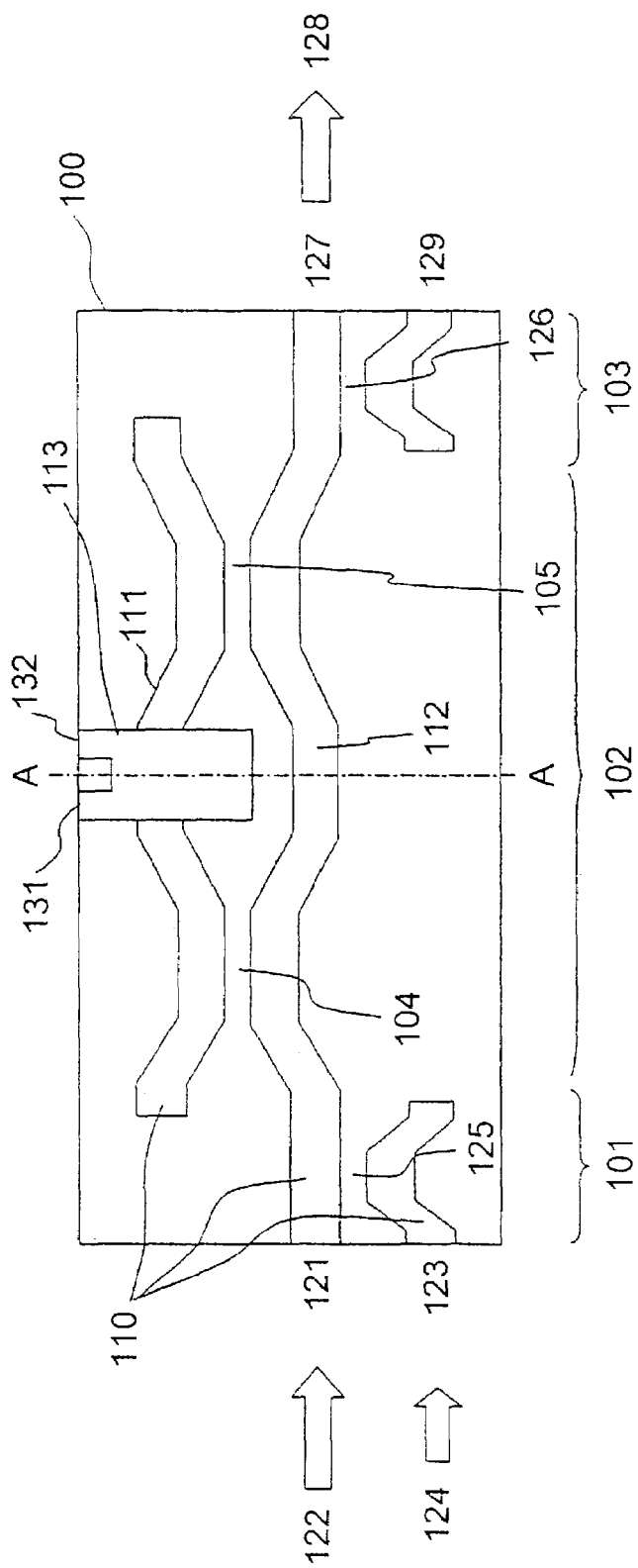
FIGS. 1A and 1B are diagrams showing a variable optical gain control device according to a first embodiment of the invention, wherein FIG. A is a plan view of the variable optical gain control device

Referring to FIGS. 1A and 1B, the former is a plan view showing the optical circuit of the first embodiment of the invention while the latter is a sectional view of the above optical circuit taken on line A—A of FIG. 1A. In the first embodiment of the invention, an optical circuit of the Mach-Zehnder type is used as a luminance intensity control portion.

The Mach-Zehnder type optical circuit has such a structure that an optical waveguide path is once divided into two arms (optical waveguide paths), thereby forming a branch arm portion, and then, these two arms are again joined up with each other. One arm of this branch arm portion is provided with a thin film heater. With the thermo-optic effect given by the thin film heater, the Mach-Zehnder type optical circuit is able to change the refractive index of the optical waveguide path and the optical interference state as well. With this, the Mach-Zehnder type optical circuit makes it possible to control the luminance intensity.

As shown in FIG. 1A, the optical circuit 100 is divided into three portions, that is, a first WDM coupler portion 101, a Mach-Zehnder portion 102, and a second WDM coupler portion 103. In the Mach-Zehnder portion 102, one arm 111 is provided with a heater 113, for instance a chromium-made heater.

As shown in FIG. 1B, the sectional structure of a substrate, on which the optical waveguide path is formed, is constituted with a silicon substrate 10, a lower clad layer 11 with a film thickness of about 20 μm, cores 12 and 13 each of which forms an optical waveguide path 110 having a film thickness of about 51 μm and a width of about 5 μm, an upper clad layer 14 covering the cores 12 and 13 and having a film of about 15 μm thickness, and a heater 113 located above one core 12. Both of the lower and upper clad layers 11 and 14 are made of silicon dioxide.

The main component forming cores 12 and 13 is silicon dioxide including a certain amount of a doped impurity, for instance erbium (Er) of about 2 wt %. If an optical signal is inputted to the optical waveguide path together with the excitation light, the optical signal can be amplified with the inductive amplification function of the Er ion. To put it somewhat concretely, if the excitation light (pump laser light) is inputted to the Er-doped optical waveguide path, the optical waveguide path absorbs the light having a wavelength of 0.98 μm and 1.48 μm among from the excitation light as inputted and, then begins to emit the light having the wavelength of 1.531 μm or so. The optical signal is given luminous energy and can be amplified by making use of this inductive discharge phenomenon in association with this light emission.

The excitation efficiency varies depending on the amount of a dopant such as Er in this case, and the gain of the luminance amplification is determined by the excitation efficiency. It should be noted, however, that the amount of the dopant as doped is to be within a certain restricted range. If the dopant were to exceed or fail to reach that range, it would bring about an adverse effect or nothing. In this first embodiment, a preferable doping ratio of the dopant is 0.2 through 3.0 wt %.

In the first WDM portion 101, an input port 121 as the first port is connected with an optical fiber to which an input optical signal 122 having a wavelength band of 1.55 μm is inputted. From an input port 123 as the second port, there is inputted a pump laser light 124 having a wavelength of 1.48 μm or 0.98 μm. The input optical signal 122 inputted from the input port 121 is combined with the pump laser light 124 by means of a directional coupler 125 as the first directional coupling portion and propagates through an Er-doped optical waveguide path 110 to input to a Mach-Zehnder portion 102 as a luminance intensity control portion.

The input optical signal 122 inputted to Mach-Zehnder portion 102 is divided into two optical signals by means of the directional coupler 104 located on the left side of the Mach-Zehnder portion 102. These two divided optical signals are given to two arms 111 and 112 respectively such that the ratio of their luminance intensities becomes 1:1. While no electric current is given to a heater 113 of the arm 111, the divided input optical signals merge in phase through the directional coupler 105, thus the divided input optical signals merging and propagating without causing any luminous emission.

If an electric current is applied between the heater terminals 131 and 132 of the arm 111, the heater 113 begins to change its temperature. As a result, the refractive index of the optical waveguide path located immediately below the heater 113 is changed due to the thermo-optic effect, thus to change the phase of the optical signal propagating through the arm 111 and then, the phase-changed wave is combined with the phase-unchanged wave by the directional coupler 105 located on the right side of the Mach-Zehnder portion 102. At this time, a luminance power is emitted toward the optical waveguide path substrate and attenuates in correspondence with the phase difference between the above two optical signals. Accordingly, the maximum attenuation takes place when two optical signals are in reverse phase. In this way, the luminance intensity-controlled light is outputted in response to the phase difference between two light waves.

The optical signal controlled by the Mach-Zehnder portion 102 is propagated to the second WDM coupler portion 103, where the pump laser light 124 is separated by the directional coupler 126 as the second directional coupler portion. Then, an output optical signal 128 is put out from the output port 127 as the third port.

At this time, however, the optical signal intensity of the output optical signal 128 is amplified by about 10 bB due to effects of the Er-doped optical waveguide path 110 and the pump laser light 124. The separated pump laser light having a wavelength of 1.48 μm or 0.981 μm is outputted from the output port 129 as the fourth port, but not from the output port 127.

Ideally, the pump laser light 124 incident on the first WDM coupler portion 101 can amplify the optical signal of the Er-doped optical waveguide path at an energy conversion rate of 100%. Actually, however, such a high energy conversion rate can not be obtained because of the light reflection at the end face of the optical waveguide path, the light leakage and so forth, which are caused by the characteristic dispersion of the first WDM coupler portion 101 induced in the course of manufacturing it. Accordingly, the WDM coupler portion has to be designed by sufficiently taking account of such dispersion. Unless erbium is doped to the optical waveguide path 110, any amplification would not take place even if the excitation pulse laser light is incident on the first WDM coupler portion 101.

As has been discussed above, according to the first embodiment of the invention, there is provided a variable optical gain control device wherein there are formed on the same flat face of the substrate a luminance intensity control portion using a circuit of the Mach-Zehnder type for instance, and an optical amplification mechanism amplifying the luminance intensity by using the optical waveguide path doped with a rare earth element. With this, it becomes possible to amplify the optical signal without causing any attenuation of the optical signal while the luminance intensity of the optical signal is controlled. Accordingly, in the WDM system, it becomes possible to omit an optical fiber amplifier which has been provided on the downstream stage of a prior art VOA thus far.

Second Embodiment

Figure 2:
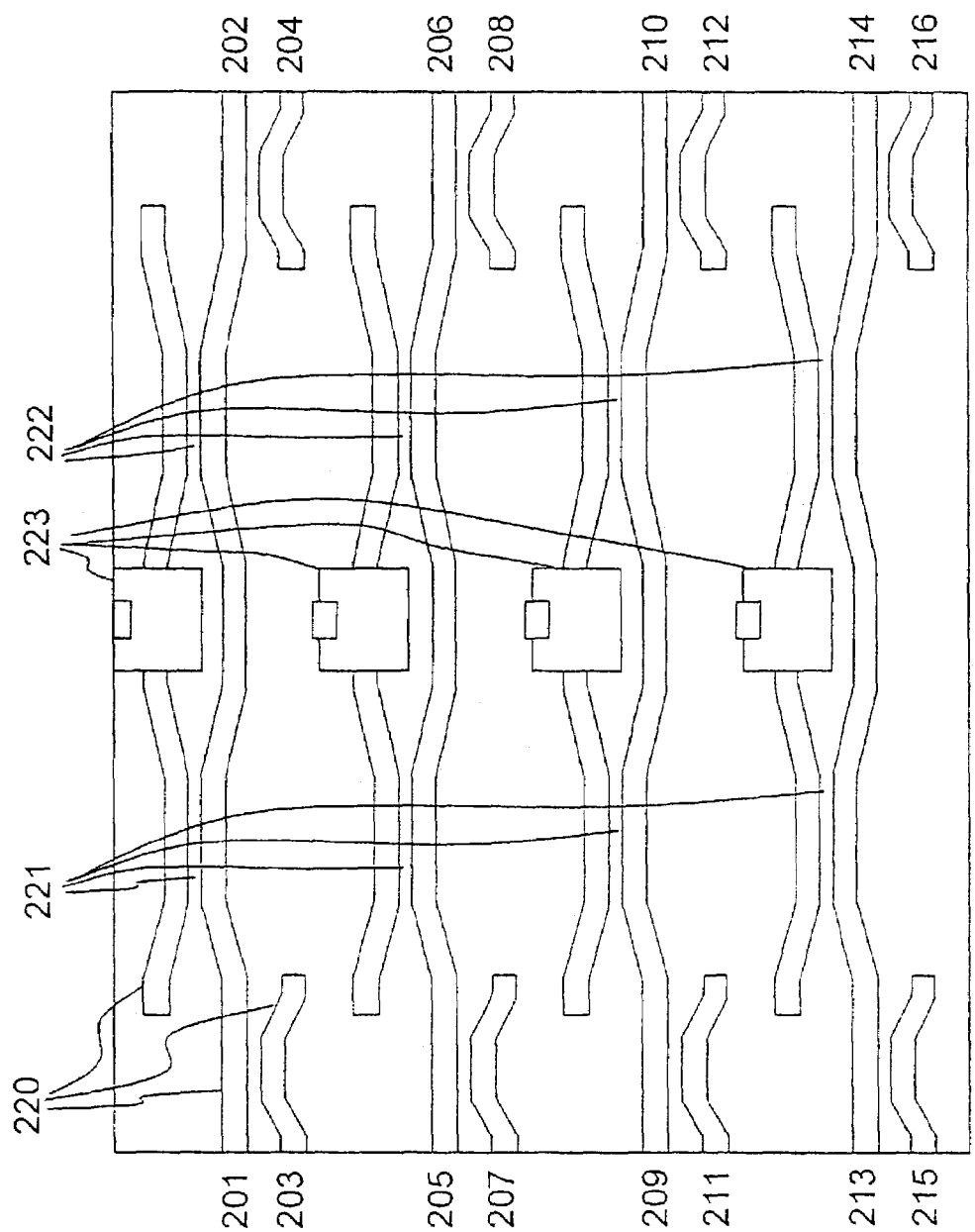
FIG. 2 is a plan view showing a variable optical gain control device according to a second embodiment of the invention.

FIG. 2 is a plan view showing the second embodiment of the invention wherein there is shown an array made up of four channels, of which each is formed of the variable optical gain control device as described in connection with the first embodiment with reference to FIG. 1. Each of input ports 201, 205, 209, and 213 as the first port group is connected with an optical fiber each, to which an optical signal having a wavelength band of 1.55 μm is inputted. A pump laser light having a wavelength of 1.48 μm or 0.981 μm is inputted from each of input ports 203, 207, 211, and 215 as the second port group.

Each of optical signals inputted from input ports 201, 205, 209, and 213 is combined with each of pump laser lights by means of each directional coupler of the first directional coupler portion group, respectively. Each of combined optical signals is divided into two optical signals by means of each of directional couplers 221 located on the left side of the Mach-Zehnder portion. These two divided optical signals are given to two arms respectively such that the ratio of their luminous intensities becomes 1:1. When the temperature of the heater 223 in each channel is made to change, the refractive index of each optical waveguide path located immediately below the heater is changed due to the thermo-optic effect, whereby the phase of the optical signal propagating through the arm immediately below the heater is changed. Then, the phase-changed wave and the phase-unchanged wave are combined by each directional coupler 222 and the luminous intensity of the optical signal in each channel is controlled according to the phase difference between two waves.

Each of controlled optical signals is separated from the pump laser light by the directional coupler of the second directional coupler portion group. As the optical waveguide path is doped with erbium, the amplified optical signal is outputted from the output ports 202, 206, 210, and 214 as the third port group.

As described in the above, according to the second embodiment of the invention, a plurality of (for instance four) variable optical gain control devices as explained in the first embodiment can be arranged to form an array made up of a plurality of (for instance four) channels. This variable optical gain control device is able to control the luminance intensity of the optical signals while the optical signals are amplified, so that simultaneous gain control of a plurality of optical signal waves becomes possible in the WDM communication. Furthermore, it becomes possible to design the device having a more compact size.

Third Embodiment

Figure 3:
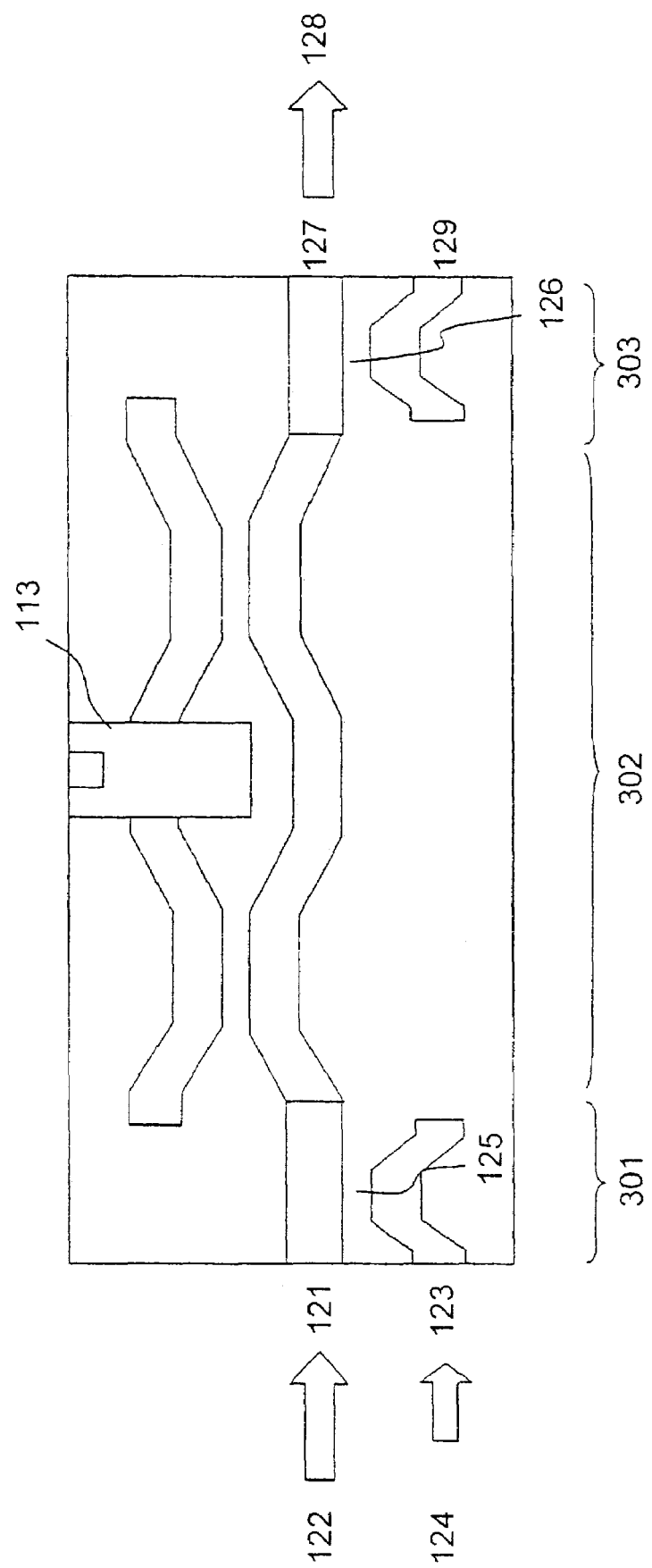
FIG. 3 is a plan view showing a variable optical gain control device according to a third embodiment of the invention.

FIG. 3 is a plan view showing the third embodiment of the invention. In the first and second embodiments, erbium is doped over the entirety of the optical waveguide path, so that the entire optical circuit acts as an optical amplification circuit. In the third embodiment, however, erbium is not doped to the Mach-Zehnder portion 302 and only the first and second WDM coupler portions 301 and 303 are doped with Er to form optical amplification portions, respectively. Accordingly, the third embodiment is similar to the first embodiment except the point that no optical amplification takes place in the Mach-Zehnder portion 302. Therefore, it is omitted to describe in detail the structure and operation of the device according to the third embodiment.

As described in the above, the variable optical gain control device according to the third embodiment is constituted such that the Mach-Zehnder portion is given neither erbium nor the amplification function. Consequently, it becomes possible to individually set parameters with regard to the Mach-Zehnder portion and the optical amplification portion, so that there is increased the degree of freedom in the design of the entire optical circuit.

In the first through third embodiments of the invention, the luminance intensity control portion is constituted by means of a circuit of the Mach-Zehnder type. However, the invention is not limited to these illustrative examples. It may be possible to use a circuit of the directional coupler type or a circuit of the Y-shaped branch type. In case of using a circuit of the directional coupler type, the luminance intensity is controlled by means of the coupling length or the degree of coupling. On the other hand, in case of using a circuit of the Y-shaped branch type, the luminance intensity is controlled by controlling the form of the optical waveguide path.

Furthermore, the embodiments of the invention are explained about the case where all the optical waveguide paths constituting the entire optical circuit are made of silicon dioxide as a principal material, but it is not limited to silicon dioxide. It is possible to use in part an optical waveguide path made of a certain organic material in combination with those which are made of silicon dioxide. Still further, in the embodiments, the heater is made of chromium but it may be made of other proper materials. Still further, in the second embodiment, it is described that four channels of the variable optical gain control devices are arrayed on the same flat face of the substrate. However, this is just illustrative to the last and the number of channels is not limited to the number as described in the second embodiment.

As discussed in the above, according to the invention, there are constituted on the same flat face of the substrate a luminous intensity control portion which is formed by using a circuit of the Mach-Zehnder type and an optical amplification portion which is created by doping the optical waveguide paths with a rare earth element. With this, it becomes possible to amplify the optical signal while the luminance intensity control of the optical signal is executed without any attenuation of the optical signal, which has been caused in the prior art.

While some preferred embodiments of the invention have been shown and described in the above with reference to the accompanying drawings, the invention is not limited to such examples. Needless to say, it will be apparent that those skilled in the art would be able to make various changes and modifications within the category of technical thoughts as recited in the scope of claim for patent attached hereto, and it is understood that those changes and modifications naturally belong to the technical category of the invention.

What is claimed is:

1. A variable optical gain control device having an optical circuit made up of optical waveguide paths formed on a flat face of a substrate, said optical gain control device comprising:

a first optical waveguide path having a first end and a second end and having a first input port at the first end;

a second optical waveguide path, separate from the first optical waveguide path, having a first end and a second end and a refractive index controlling means therebetween;

a third optical waveguide path and a fourth optical waveguide path, the third optical waveguide path having a second input port, the first and second input ports receiving an optical signal and excitation light, the third and fourth optical waveguide paths being disconnected from each other and isolated from the second optical waveguide path;

a first directional coupler connected to the respective first ends of the first and second optical waveguide paths; and a second directional coupler connected to the respective second ends of said first and second optical waveguide paths;

a third directional coupler connected to the third optical waveguide path and the first end of the first optical waveguide path for coupling the excitation light and the optical signal, the first directional coupler receiving from the third directional coupler and dividing between the first and second optical waveguide paths the coupled optical signal and the excitation light, the second directional coupler combining the optical signal and the excitation light from the first and second optical waveguide paths and outputting the same; and a fourth directional coupler connected to the fourth optical waveguide path and the second end of the first optical waveguide path for decoupling the combined excitation light and the optical signal output from the second directional coupler and outputting the decoupled optical signal, wherein said first and second optical waveguide paths are doped with a rare earth element for amplifying the optical signal by means of the excitation light, and together with the first and second directional couplers form a Mach-Zehnder circuit portion for controlling luminance intensity of the amplified optical signal.

2. The variable optical gain control device as claimed in claim 1, wherein said rare earth element is erbium.

3. The variable optical gain control device as claimed in claim 2, wherein said erbium has a concentration in the range of 0.2 to 3.0 wt %.

4. The variable optical gain control device as claimed in claim 1, wherein said optical signal is a signal having a wavelength of approximately 1.55 µm and said excitation light is a light having a wavelength of approximately 1.48 µm or 0.98 µm.

5. The variable optical gain control device as claimed in claim 1, wherein said refractive index controlling means is a heater disposed on said second optical waveguide path.

6. A variable optical gain control device having an optical circuit made up of optical waveguide paths formed on a flat face of a substrate, said optical gain control device including a plurality of variable optical gain control units on the substrate, each unit comprising:
   a first optical waveguide path having a first end and a second end and having a first input port at the first end;
   a second optical waveguide path, separate from the first optical waveguide path, having a first end and a second end and a refractive index controlling means therebetween;
   a third optical waveguide path and a fourth optical waveguide path, the third optical waveguide path having a second input port, the first and second input ports receiving an optical signal and excitation light, the third and fourth optical waveguide paths being disconnected from each other and isolated from the second optical waveguide path;
   a first directional coupler connected to the respective first ends of the first and second optical waveguide paths;
   a second directional coupler connected to the respective second ends of the first and second optical waveguide paths;
   a third directional coupler connected to the third optical waveguide path and the first end of the first optical waveguide path for coupling the excitation light and the optical signal, the first directional coupler receiving from the third directional coupler and dividing between the first and second optical waveguide paths the coupled optical signal and the excitation light, the second directional coupler combining the optical signal and the excitation light from the first and second optical waveguide paths and outputting the same; and
   a fourth directional coupler connected to the fourth optical waveguide path and the second end of the first optical waveguide path for decoupling the combined excitation light and the optical signal output from the second directional coupler and outputting the decoupled optical signal,
   wherein said first and second optical waveguide paths are doped with a rare earth element for amplifying the optical signal by means of the excitation light, and together with the first and second directional couplers form a Mach-Zehnder circuit portion for controlling luminance intensity of the amplified optical signal.

7. The variable optical gain control device as claimed in claim 6, wherein said rare earth element is erbium.

8. The variable optical gain control device as claimed in claim 7, wherein said erbium has a concentration in the range of 0.2 to 3.0 wt %.

9. The variable optical gain control device as claimed in claim 6, wherein said optical signal is a signal having a wavelength of approximately 1.55 µm and said excitation light is a light having a wavelength of approximately 1.48 µm or 0.98 µm.

10. The variable optical gain control device as claimed in claim 6, wherein said refractive index controlling means is a heater disposed on said second optical waveguide path.

11. A variable optical gain control device having an optical circuit made up of optical waveguide paths formed on a flat face of a substrate, said optical gain control device comprising:
   a first port for receiving an optical signal inputted thereto;
   a second port for receiving excitation light inputted thereto;
   an input directional coupler portion doped with a rare earth element, for combining the optical signal and the excitation light and amplifying the optical signal by means of the excitation light;
   a Mach-Zehnder circuit portion, free of rare earth element doping, for controlling luminance intensity of the amplified optical signal from said input directional coupler portion;
   an output directional coupler portion doped with a rare earth element, for further amplifying by means of the excitation light, the optical signal of which the luminance intensity has been controlled by said Mach-Zehnder circuit portion, and for separating the further amplified optical signal from the excitation light;
   a third port for outputting the further amplified optical signal; and
   a fourth port for outputting the excitation light,
   wherein said Mach-Zehnder circuit portion includes
      a first optical waveguide path having a first end and a second end,
      a second optical waveguide path, separate from the first optical waveguide path, having a first end and a second end and a refractive index controlling means therebetween,
      a first directional coupler connected to the respective first ends of said first and second optical waveguide paths, for dividing between said first and second optical waveguide paths the optical signal and the excitation light inputted from said input directional coupler portion, and a second directional coupler connected to the respective second ends of said first and second optical waveguide paths, for combining the optical signal and the excitation light from said first and second optical waveguide paths and outputting the same to said output directional coupler portion.

12. The variable optical gain control device as claimed in claim 11, wherein said rare earth element is erbium.

13. The variable optical gain control device as claimed in claim 12, wherein said erbium has a concentration in the range of 0.2 to 3.0 wt %.

14. The variable optical gain control device as claimed in claim 11, wherein said optical signal is a signal having a wavelength of approximately 1.55 μm and said excitation light is a light having a wavelength of approximately 1.48 μm or 0.98 μm.

15. The variable optical gain control device as claimed in claim 11, wherein said refractive index controlling means is a heater disposed on said second optical waveguide path.

16. The variable optical gain control device as claimed in claim 11, wherein the input directional coupler portion includes a third optical waveguide path, a rare earth element-doped optical waveguide input path portion connected to the first end of the first optical waveguide path and a third directional coupler connected to the third optical waveguide path and the rare earth element-doped optical waveguide input path portion for coupling the excitation light and the optical signal, and the output directional coupler portion includes a fourth optical waveguide path, a rare earth element-doped optical waveguide output path portion connected to the second end of the first optical waveguide path, and a fourth directional coupler connected to the fourth optical waveguide path and the rare earth element-doped optical waveguide output path portion for decoupling the combined excitation light and the optical signal output from the second directional coupler and outputting the decoupled optical signal.

* * * * *